United States Patent
Chen et al.

(10) Patent No.: US 8,823,826 B2
(45) Date of Patent: *Sep. 2, 2014

(54) DIGITAL CAMERA AND IMAGE CAPTURING METHOD

(71) Applicant: MediaTek Inc., Hsin-Chu (TW)

(72) Inventors: Wan-Yu Chen, New Taipei (TW); Chih-Hui Kuo, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,656

(22) Filed: Jun. 10, 2013

(65) Prior Publication Data
US 2013/0265404 A1    Oct. 10, 2013

Related U.S. Application Data

(63) Continuation of application No. 12/419,408, filed on Apr. 7, 2009, now Pat. No. 8,482,626.

(51) Int. Cl.
| | |
|---|---|
| *H04N 5/228* | (2006.01) |
| *H04N 5/225* | (2006.01) |
| *G06K 9/00* | (2006.01) |
| *H04N 5/232* | (2006.01) |
| *G06F 3/01* | (2006.01) |
| *H04N 101/00* | (2006.01) |

(52) U.S. Cl.
CPC .............. *G06F 3/013* (2013.01); *H04N 5/23222* (2013.01); *H04N 2101/00* (2013.01); *H04N 5/23219* (2013.01); *G06K 9/00221* (2013.01); *G06K 9/00604* (2013.01); *H04N 5/232* (2013.01)
USPC ................... 348/222.1; 348/207.99; 382/103

(58) Field of Classification Search
CPC .............. H04N 5/232; H04N 5/23219; H04N 5/23222; H04N 2101/00; G06F 3/013; G06K 9/00221; G06K 9/00604
USPC ......... 348/78, 103, 118, 195, 218, 222.1, 239
See application file for complete search history.

(56) References Cited

U.S. PATENT DOCUMENTS

| | | | |
|---|---|---|---|
| 5,461,453 A | 10/1995 | Watanabe et al. | |
| 5,623,703 A | 4/1997 | Takagi et al. | |
| 5,861,940 A | 1/1999 | Robinson et al. | |
| 7,206,022 B2 | 4/2007 | Miller et al. | |
| 7,233,684 B2 | 6/2007 | Fedorovskaya et al. | |
| 7,574,128 B2 | 8/2009 | Matsuda | |
| 8,063,786 B2 * | 11/2011 | Manotas, Jr. | ............. 340/576 |
| 2008/0056542 A1 | 3/2008 | Hung et al. | |
| 2008/0080846 A1 | 4/2008 | Grip | |

(Continued)

FOREIGN PATENT DOCUMENTS

CN    101620359    1/2010

*Primary Examiner* — Trung Diep
(74) *Attorney, Agent, or Firm* — McClure, Qualey & Rodack, LLP

(57) ABSTRACT

A digital camera and an image capturing method for photographing at least one object in the digital camera. An image is sensed, and an eye-gazing detection process is accordingly preformed on the image to detect an eye-gazing direction of at least one pair of eyes of the at least one object. It is determined whether the eye-gazing direction meets a gazing criterion. If the eye-gazing direction meets the gazing criterion, an application of the digital camera is triggered.

15 Claims, 3 Drawing Sheets

(56) References Cited

U.S. PATENT DOCUMENTS

| | | |
|---|---|---|
| 2008/0273097 A1 | 11/2008 | Nagashima |
| 2009/0059021 A1 | 3/2009 | Rimon et al. |
| 2009/0066803 A1 | 3/2009 | Miyata |
| 2009/0110245 A1 | 4/2009 | Thorn |
| 2010/0225773 A1 | 9/2010 | Lee |

\* cited by examiner

DIGITAL CAMERA AND IMAGE CAPTURING METHOD

CROSS REFERENCE TO RELATED APPLICATIONS

This application is a Continuation of U.S. patent application Ser. No. 12/419,408, filed Apr. 7, 2009, now U.S. Pat. No. 8,482,626 and entitled "Digital Camera and Image Capturing Method," the entirety of which is incorporated herein by reference.

BACKGROUND

1. Technical Field

The disclosed embodiments relate to digital cameras, and in particular, to an image capturing method employing eye-gazing detection to trigger various applications.

2. Description of the Related Art

Digital cameras are designated to be compact and cost effective, thus the computation power is limited due to power consumption and cost issues. For most of the digital cameras, response time of a digital camera may not be as fast as high end devices, thus the performance is affected by shutter latency. Shutter latency means a period of response time between button triggering and image capturing. Due to the shutter latency, it is difficult to capture a picture at the right timing, particularly when the object to be photographed is a moving living species such as humans or pets.

Furthermore, most users desire to capture the eyes of living species being photographed. In other words, the best time to take a picture may be when the eyes of living species being photographed are gazing at the digital camera. However, such a picture is difficult to acquire; especially when the object being photographed is a large group of people, a kid or a pet since they are, however, uncontrollable. Thus, it is desirable to develop an improved function for digital cameras to overcome above-mentioned problems.

SUMMARY

An exemplary embodiment of an image capturing method is provided for photographing at least one object in a digital camera. An image is first sensed, and an eye-gazing detection process is performed on the image to detect an eye-gazing direction of at least one pair of eyes of the at least one object. It is determined whether the eye-gazing direction meets a gazing criterion. If the eye-gazing direction meets the gazing criterion, an application of the digital camera is triggered.

Another exemplary embodiment of a digital camera is provided for photographing at least one object. In the digital camera, a photo sensor module senses an image. A user interface includes a display operative to display the image. A memory device is employed for storage of the image. A processor is coupled to the photo sensor module, memory device, and the user interface, performing the eye-gazing detection process on the image, determining whether the eye-gazing direction meets a gazing criterion, and triggering an application of the digital camera if the eye-gazing direction has met a gazing criterion. A detailed description is given in the following embodiments with reference to the accompanying drawings.

BRIEF DESCRIPTION OF THE DRAWINGS

The embodiments of the invention can be more fully understood by reading the subsequent detailed description and examples with references made to the accompanying drawings, wherein.

DETAILED DESCRIPTION

Figure 1A:
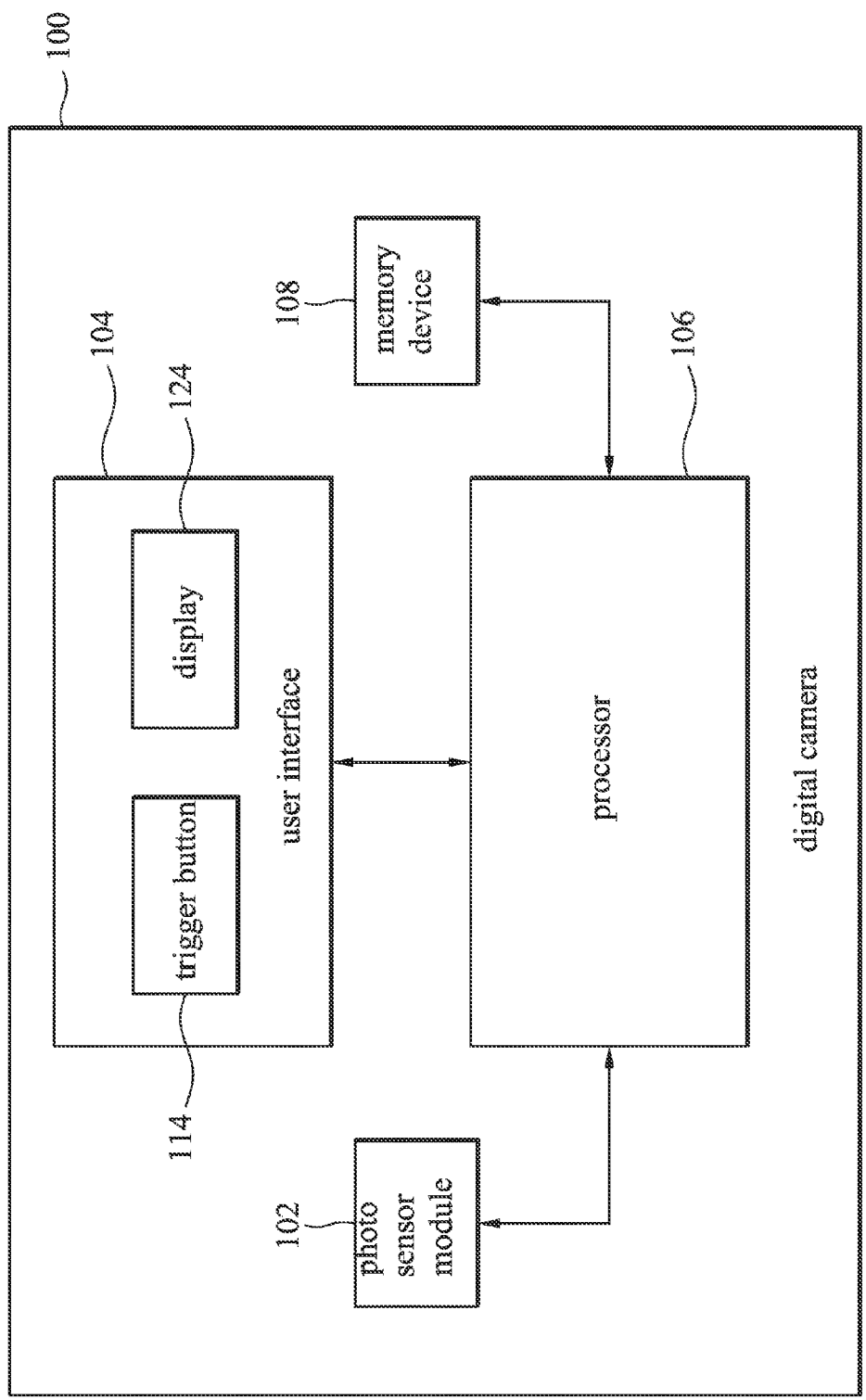
FIG. 1a shows a digital camera according to an embodiment of the invention.

In the following detailed description, for purposes of explanation, numerous specific details are set forth in order to provide a thorough understanding of the present invention. It will be apparent, however, that the present invention may be practiced without these specific details. In other instances, well-known structures and devices are schematically shown in order to simplify the drawing.

To take a picture at right time when eyes of objects being photographed are gazing at a digital camera, a real time monitoring mechanism may be implemented to assist a photographer.

FIG. 1a shows an embodiment of a digital camera 100 according to the invention. A user interface 104 typically comprises a panel (not shown) for user control, a trigger button 114 for taking a picture, and a display 124. A photo sensor module 102 includes a lens, a shutter and a photo sensor such as a Charge Coupled Device (CCD) or a Complementary Metal-Oxide Semiconductor (CMOS) (not shown) dedicated to convert received light into digital signals, and that is how an image is sensed. The photo sensor may sense an image in various mechanisms. For example, in traditional shutter mechanism, the trigger button 114 is used to trigger the shutter in the photo sensor module 102 to open an aperture for a brief period. The brief period is conventionally referred to as an exposure time. The photo sensor is thereby exposed to the lights through the aperture for the exposure time duration, and such that the lights are converted into digital signals.

Live viewing is also a prevalent mechanism. In a live view mode, the shutter is kept open, and the photo sensor is continuously activated to capture images of every moment, generally at a rate of 30 frames per second (FPS). The mode is so called "live view" because the images can be displayed instantly on the display 124, presenting as live moving pictures. When the trigger button 114 is triggered in the live view mode, an image corresponding to the moment is captured and stored into the memory device 108. The memory device 108 can be various known devices such as Compact Flash (CF) card, Secure Digital (SD) Card or a hard disk drive.

In the digital camera 100, a processor 106 connected to the photo sensor module 102, the user interface 104 and the memory device 108, controls various functions. For example, an eye-gazing detection process is performed by the processor 106, to detect at least one eye-gazing direction of at least one pair of eyes of objects. The processor 106 may receive a trigger signal from the user interface 104 to initialize the eye-gazing detection process, and trigger a particular application of the digital camera 100 if the eye-gazing direction has met a gazing criterion. Generally, in order to provide instant response to the scenes, the eye-gazing detection is performed in live view mode. A detailed embodiment is described in the following flowcharts.

Figure 1B:
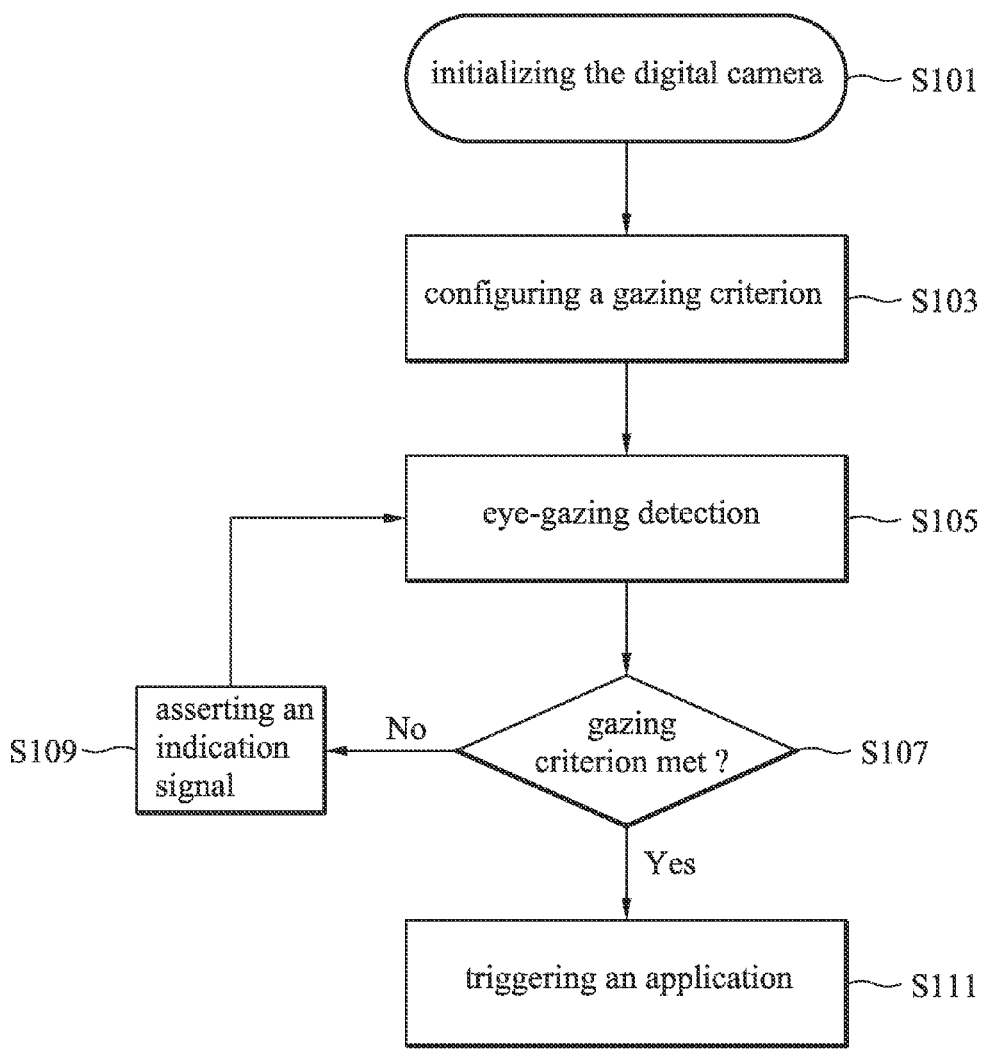
FIG. 1b illustrates a flowchart of an image capturing method according to an embodiment of the invention.

FIG. 1b is a flowchart of an embodiment of the image capturing method implemented on the digital camera 100. Please note that if the result is substantially the same, the steps are not required to be executed in the exact order shown in FIG. 1b. In step S101, the digital camera 100 is initialized, wherein an eye-gazing detection mechanism is installed in the processor 106 as a firmware or application specific integrated chip (ASIC). In practice, the photo sensor module 102 of the digital camera 100 continuously senses an image after being powered up. To be precise, the digital camera 100 continuously samples photo signals at a certain frame rate to generate a consecutively updating image. As known, the image is usually displayed on a display 124 of the digital camera 100, facilitating users to composite a desired picture. Thus, the eye-gazing detection may be a sub-routine executed by the processor 106 to constantly monitor the image for triggering designated applications.

In step S105, the eye-gazing detection process is preformed on the image to detect at least one eye-gazing direction of at least one pair of eyes. In an embodiment of the invention, the eye-gazing detection process can be performed when a trigger button 114 in the digital camera 100 is pressed. Alternatively, the eye-gazing detection process can be performed instantly after the digital camera 100 is powered up. As known, face detection is a prevailing technology bundled with various applications such as focusing on faces and smile capturing. The invention provides further applications based on the detected eye-gazing directions, which will be described in the following. In step S107, the sensed image is sent from the photo sensor module 102 to the processor 106, allowing the processor 106 to determine whether the eye-gazing direction meets a gazing criterion. The gazing criterion to trigger an application is programmable. If the gazing criterion is not met in step S107, step S109 is performed. Otherwise, if the gazing criterion is met, step S111 is performed.

In step S109, an indication signal is asserted through the user interface 104, allowing objects being photographed to adjust their poses accordingly. The indication signal may be a voice signal, a blinking LED or a displayed character. For example, when a group picture is to be taken, the digital camera 100 may indicate the number of pairs of eyes detected, or raise an alarm to attract the objects being photographed (particularly for pets or kids), thereby increasing the success rate of taking a picture when all eyes the objects being photographed are gazing at the camera. After the indication signal is asserted in step S109, the image capturing method goes back to step S105 to perform the eye-gazing detection process for detecting the eye-gazing direction and then determine whether the detected eye-gazing direction meets the gazing criterion in step S107 again. Please note that step S109 is optional that the image capturing method may go to step S105 directly if the detected eye-gazing direction do not meet the gazing criterion in S107.

In step S111, if the eye-gazing direction has met the gazing criterion, a particular application can be triggered. The particular application, for example, may implement instant photo capture upon the eyes gazing with the digital camera. However, the invention is not limited to this function. Various applications may also be implemented based on the eye-gazing directions detected. For example, a particular application may be implemented to assert an indication signal when the gazing criterion is met. In addition to the described example wherein the shutter is triggered to take a photo upon eye-gazing, there are many circumstances that may be facilitated by the eye-gazing detection. For example, an auto focusing application can be provided to focus on any pair of gazed eyes. If there are many people in the picture, the lens focus may be automatically focused to the ones who gaze at the digital camera. Furthermore, since the eye-gazing direction is detectable, the lens focus may be automatically focused on an object on the direction where the eyes are gazing. An auto shuttering application can also be provided, in which the shutter in the photo sensor module 102 is automatically triggered upon all or a number of people gazing upon the digital camera, allowing unattended shutter triggering to be implemented.

Furthermore, the image may be captured and saved as a photograph upon all eyes being detected and facing to the digital camera. If the digital camera is in a video mode, the image may be recorded as a moving picture. Meanwhile, when the gazing criterion is met, the digital camera may only indicate that criterion is met to photographers and objects being photographed. All the above-mentioned applications can be implemented by the processor 106 in the digital camera with a programmable firmware.

The gazing criterion may be configured through the user interface 104 before entering the eye-gazing detection process in S105, such as in step S103. Various considerations to configure a gazing criterion are discussed as follows.

The gazing criterion may define the eye-gazing direction of at least one pair of eyes with respect to the digital camera 100. If required, the eye-gazing direction may also be designated at a specific angle as the gazing criterion to trigger the shutter to take a picture of different styles. The eye-gazing direction is detectable using various known algorithms, mostly adapted in medical systems for assisting disabled people. For example, the eye-gazing direction can be determined according to comparison of locations of face and the pair of eyes with respect to the camera and location of pupils of the pair of eyes with respect to the camera. Thus, detailed introduction is not described herein.

Step S105 is a repetitive process, thus a plurality of detection results can form a sequence, such as a trail of consecutive eye-gazing directions. The trail may feature specific patterns that can be recognized as meaningful gestures, so as to direct the camera to respond with specific operations accordingly. To implement the gesture recognition, the gazing criterion may further define a trail pattern to be compared with the trail of consecutive eye-gazing directions.

The gazing criterion may also define a number of pairs of eyes gazing at the digital camera 100 if a group of people is to be photographed in one picture. Since the possibility for all people to simultaneously look at the digital camera is lower as the number of people increases, the gazing criterion may alternatively define a threshold or a number of pairs of eyes that are gazing at the digital camera 100. For example, the threshold may be defined as 60%, then, when six people among ten people are gazing at the digital camera, the picture is taken.

Figure 2:
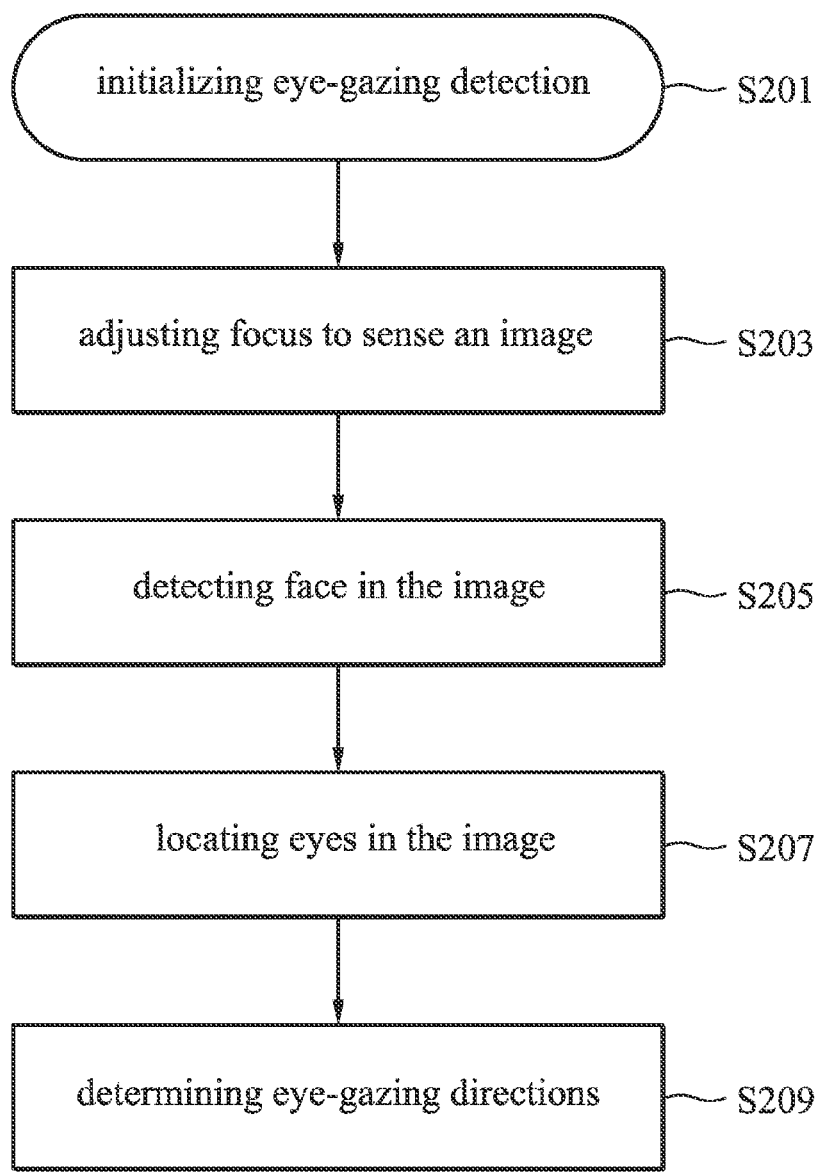
FIG. 2 is a flowchart of an eye-gazing detection process according to an embodiment of the invention.

FIG. 2 is a flowchart of eye-gazing detection process performed in step S105 according to an embodiment of the invention. Please note that if the result is substantially the same, the steps are not required to be executed in the exact order shown in FIG. 2. The eye-gazing detection process is a series of algorithms. There are presently various known algorithms implementing face detection and eye tracking, and the invention provides further applications based thereon. In step S201, the eye-gazing detection is initialized. To detect eyes, the digital camera must sense a sharp image, thus, focusing is required. In step S203, the digital camera adjusts its focus to sense a sharp image. As known, in an image, out of focus objects are blurred, and the blurred effect is also referred to as "bokeh". For large aperture lenses and long-ranged lenses, bokeh occurs in the image while only the object on the focus is sharp. Since it is difficult to analyze blurred portion of an image, the eye-gazing detection process may be performed only within the focus range. Thus, the focus range is a parameter to be concerned with. Generally, a typical digital camera is capable of auto focusing (AF). For example, a user can define a focus criterion through the user interface 104 to specify that the eye-gazing detection process is performed on objects within the focus range such as 2 to 5 meters. In this case, only faces or eyes within the focus range of 2 to 5 meters are to be detected or located. Thus, faces or eyes of objects out of the range would be ignored.

In step S205, faces within the image are detected. Since there are various known technologies to implement face detection, detailed introduction is omitted. In step S207, at least one pair of eyes of the detected faces in the image is located. Please note that step S205 is an optional step, so step S207 may be performed directly following step S203 to locate at least one pair of eyes within the image. Further, through appropriate programming, not only human eyes are detectable. Other animals such as dog eyes and cat eyes may also be applicable.

In step S209, pupils of the pair of eyes are analyzed to determine the eye-gazing direction. As a simplest example, one eye-gazing direction detected to be held over a particular period, can be seen as a gazing criterion match. Nevertheless, in practice, consecutive eye-gazing activities are considered as parameters to find the trigger. For example, a plurality of eye-gazing directions sampled over a period of time may form a trail pattern such as a circular, an up and down trail, and so on. A trail of consecutive eye-gazing directions can be assessed as a gesture that expresses user thoughts. Other activities such as eyelids blinking, closing or remaining wide opened may also be considered as parameters to find the trigger. For example, when a person being photographed blinks his/her eyes twice, a particular application can be triggered, such as taking the picture, or recording a motion picture.

Based on a properly defined gazing criterion, when the eye-gazing activities are detected as having blinked twice, circling around, or rapidly looking up and down, a particular camera application may be triggered, such as turning on the flash light or filming a moving picture. In other words, based on the eye-gazing detection technology, various applications as described in step S111 can be triggered.

The invention is particularly adaptable in a digital camera, or a portable device capable of photography. The capturing method can be implemented in software or a dedicated chip. Moreover, if the computation power allows, the eye-gazing detection can incorporate a motion predictor to trigger the shutter in advance to compensate for the shutter latency. This is particularly useful when the object to be photographed moves fast.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method for a digital camera, comprising:
sensing an image;
performing an eye-gazing detection process on the image to detect an eye-gazing direction of at least one eye of at least one object in the image;
determining whether the eye-gazing direction meets a gazing criterion, wherein the gazing criterion defines a specific angle of the eye-gazing direction of the at least one eye of the at least one object with respect to the digital camera, and wherein the eye-gazing direction is determined by analyzing pupils of the at least one eye; and
triggering an application of the digital camera in response to the eye-gazing direction meeting the gazing criterion.

2. The image processing method as claimed in claim 1, further comprising, asserting an indication signal if the gazing criterion is not met thereby allowing the at least one object to react for meeting the gazing criterion.

3. The image processing method as claimed in claim 1, wherein the indication signal is a voice signal, a blinking LED or a displayed character.

4. The image processing method as claimed in claim 1, further comprising configuring the gazing criterion prior to performing the eye-gazing detection process.

5. The image processing method as claimed in claim 1, wherein the gazing criterion defines a number of the at least one of eyes gazing at the digital camera.

6. The image processing method as claimed in claim 1, wherein the eye-gazing detection process is performed when a trigger button of the digital camera is pressed.

7. The image processing method as claimed in claim 1, wherein:
the eye-gazing detection process further comprises detecting at least one face in the image; and
locating the at least one eye within the detected faces.

8. The image processing method as claimed in claim 1, wherein the digital camera captures the image, stores the image, records the image as a moving picture, or asserts an indication signal indicating that the gazing criterion is met as the triggered application of the digital camera in response to the eye-gazing direction meeting the gazing criterion.

9. A digital camera comprising:
a photo sensor module, operative to sense an image;
a user interface, comprising:
a display, operative to display the image;
a memory device, for storage of the image;
a processor, coupled to the photo sensor module, memory device, and user interface, performing an eye-gazing detection process on the image to detect an eye-gazing direction of at least one eye of at least one object, determining whether the eye-gazing direction meets a gazing criterion, and triggering an application of the digital camera in response to the eye-gazing direction meeting a gazing criterion,
wherein the gazing criterion defines a specific angle of the eye-gazing direction of the pair of eyes of the at least one object with respect to the digital camera; and
wherein the eye-gazing direction is determined by analyzing pupils of the at least one pair of eyes.

10. The digital camera as claimed in claim 9, wherein the user interface asserts an indication signal if the gazing criterion is not met, thereby allowing the at least one object to react for meeting the gazing criterion.

11. The digital camera as claimed in claim 9, wherein the indication signal is a voice signal, a blinking LED or a displayed character.

12. The digital camera as claimed in claim 9, wherein the gazing criterion is configured through the user interface.

13. The digital camera as claimed in claim 9, wherein the gazing criterion defines a number of at least one eye gazing at the digital camera.

14. The digital camera as claimed in claim 9, wherein the processor performs the eye-gazing detection process to further:
detect at least one face in the image; and
locate the at least one eye within the detected at least one face.

15. The digital camera as claimed in claim 9, wherein the processor triggers the digital camera to capture the image, store the image into the memory device, record the image as a moving picture, or assert an indication signal through the user interface for indicating that the gazing criterion is met if the eye-gazing direction meets the gazing criterion.

* * * * *